(12) United States Patent
Sorek et al.

(10) Patent No.: US 9,069,225 B2
(45) Date of Patent: Jun. 30, 2015

(54) METHODS AND SYSTEMS FOR ENHANCED VIEWING OF A DISPLAY DEVICE

(71) Applicant: Broadcom Corporation, Irvine, CA (US)

(72) Inventors: Noam Sorek, Zichron Yacoov (IL); Larry Alan Pearlstein, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/041,240

(22) Filed: Sep. 30, 2013

(65) Prior Publication Data

US 2015/0070742 A1 Mar. 12, 2015

Related U.S. Application Data

(60) Provisional application No. 61/875,315, filed on Sep. 9, 2013.

(51) Int. Cl.
*G02F 1/23* (2006.01)
*G02B 5/20* (2006.01)

(52) U.S. Cl.
CPC ... *G02F 1/23* (2013.01); *G02B 5/20* (2013.01)

(58) Field of Classification Search
USPC .......................................... 359/630
See application file for complete search history.

(56) References Cited

U.S. PATENT DOCUMENTS

2014/0022637 A1* 1/2014 Richards et al. ............. 359/464

* cited by examiner

*Primary Examiner* — James Jones
(74) *Attorney, Agent, or Firm* — Brinks Gilson & Lione

(57) ABSTRACT

A method and system for enhanced viewing of a display device is disclosed in this application. In some implementations, a method and system for improving a perceived contrast of a screen of a display device is disclosed. Some implementations may also relate to a method and system for privately viewing content displayed on a screen.

20 Claims, 8 Drawing Sheets

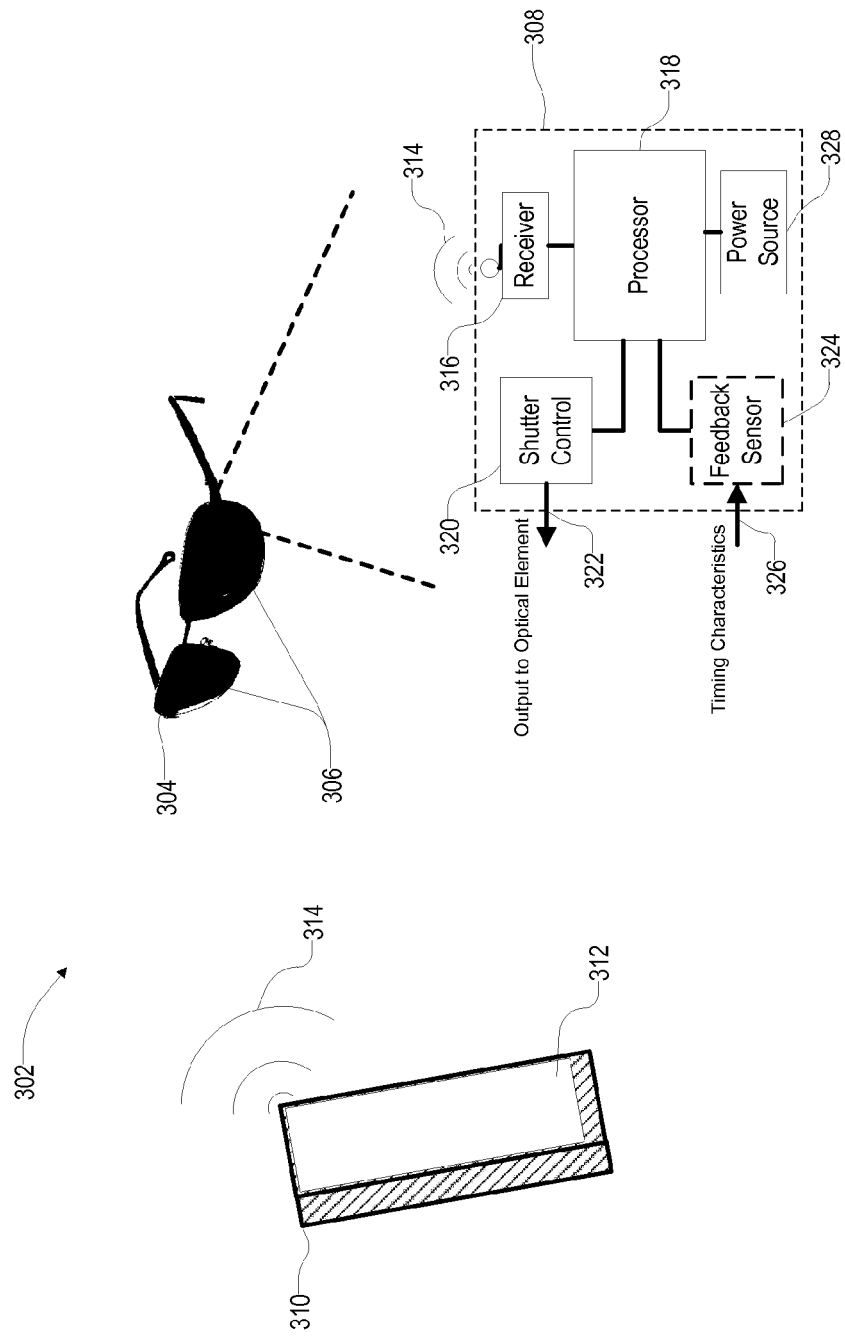

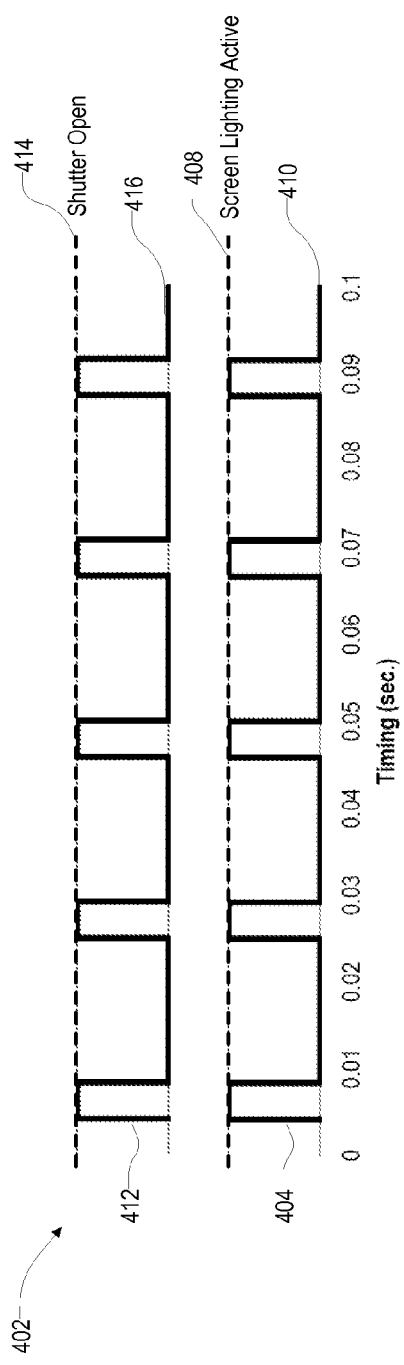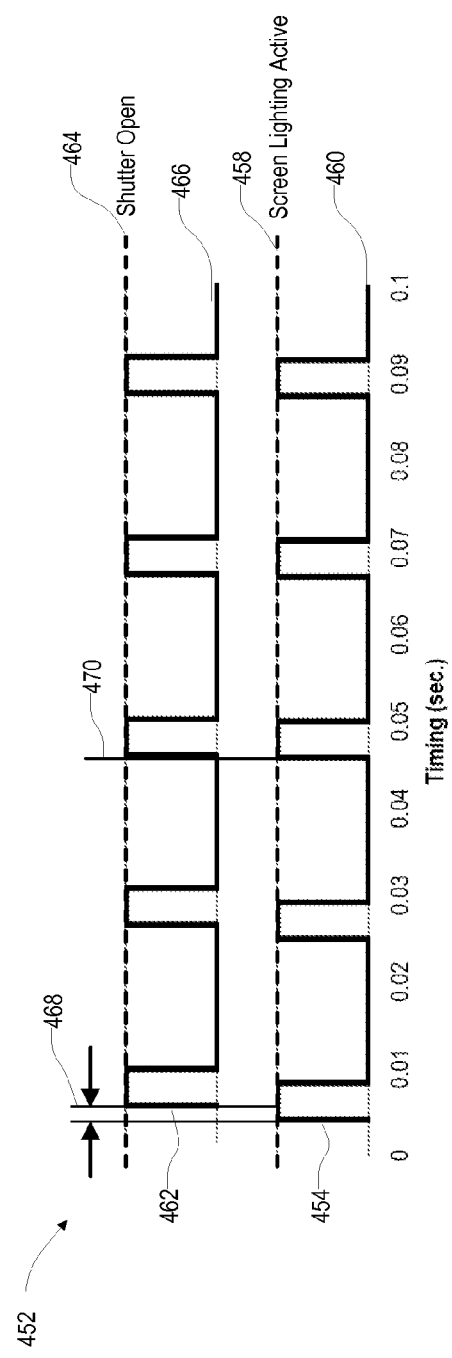

METHODS AND SYSTEMS FOR ENHANCED VIEWING OF A DISPLAY DEVICE

CROSS REFERENCE TO RELATED APPLICATIONS

This application is a non-provisional of and claims the benefit of U.S. Provisional Patent Application No. 61/875,315 filed Sep. 9, 2013, entitled "Methods And Systems For Enhanced Viewing Of A Display Device" the content of which is hereby incorporated by reference in its entirety.

TECHNICAL FIELD

The present disclosure relates to a method and system for enhanced viewing of a display device.

BACKGROUND

Electronic devices are becoming increasing prevalent in modern society. These devices are operated in a variety of environments corresponding to a variety of conditions that may affect the performance of a particular device. One example of a scenario that may lead to a performance limitation for an electronic device may include viewing a screen of an electronic device in bright ambient lighting conditions. The disclosure relates to enhanced viewing of a display device that may improve a perceived contrast of a screen viewed in bright ambient lighting conditions.

BRIEF DESCRIPTION OF THE DRAWINGS

FIG. 3 is an example of a system for improving a perceived contrast of a screen;

FIG. 4a is an example of a timing diagram of a system for improving a perceived contrast of a screen;

FIG. 4b is an example of a timing diagram demonstrating a timing correction of a system for improving a perceived contrast of a screen;

DETAILED DESCRIPTION

The disclosure provides for systems and methods for a device, for example an eyewear device, that may complement a display of a portable device. In some implementations, the device may be designed to block portions of an ambient light spectrum while allowing the light spectrum corresponding to a light output from a display to pass through an optical element. In some implementations, an optical element of the device may comprise at least one filter, for example a narrow-band filter, corresponding to light generated by a display. The at least one filter may be incorporated into an optical element of the device. The at least one filter may further allow wavelengths corresponding to one or more display primaries of a display to pass through the optical element, but may block wavelengths away from the wavelengths of the one or more display primaries or other wavelengths.

In some implementations, the device may incorporate active shutters. The shutters may be operable to synchronize a transparency of at least one optical element with an output timing of light emitted from a display device. The shutters of the device may serve to limit ambient light viewed through the device while allowing most or all of the light emitted from the display device to be viewed. The active shutters of the device may also be applied to reveal hidden content shown on a display. Each of the various implementations disclosed herein may be implemented in combination to provide systems and methods for enhanced viewing of a display device.

Figure 1:
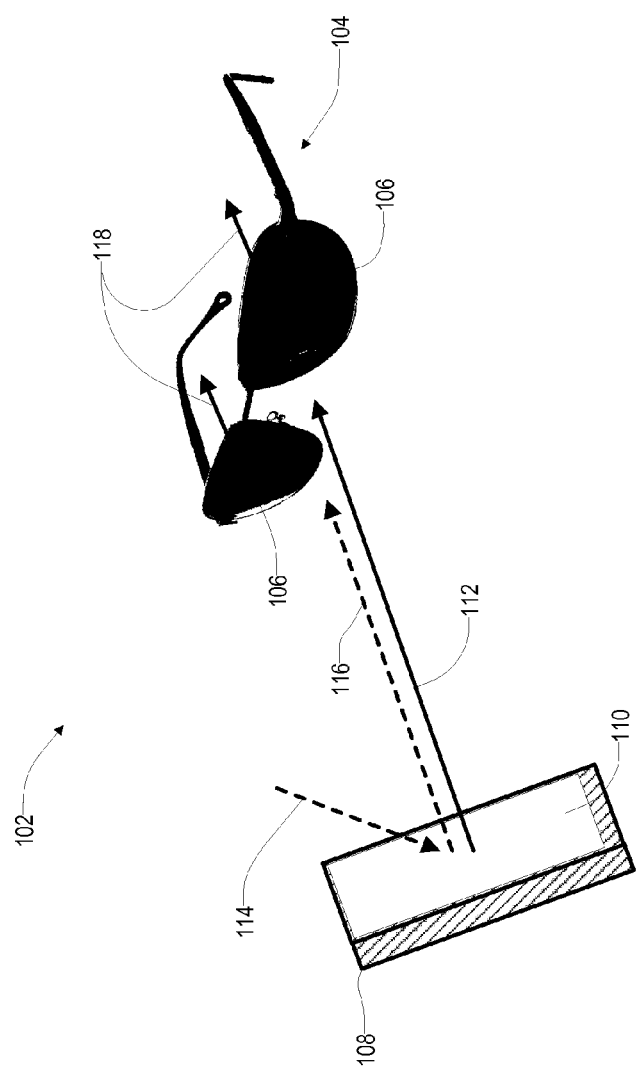
FIG. 1 is an example of systems for improving a perceived contrast of a screen.

Referring to FIG. 1, an example of a system 102 for improving a perceived contrast of a screen is shown in accordance with the disclosure. The system may comprise an eyewear device 104 comprising at least one optical element 106. The eyewear device 104 may comprise any device having at least one optical element 104. For example, the eyewear device may comprise glasses, sunglasses, a visor, goggles, a monocle, a lens, a contact lens, or any other wearable optical device. The at least one optical element 106 may comprise an optical lens or any form of lens operable to pass visible light at a range of wavelength.

The eyewear device 104 may be configured to operate in conjunction with a display device 108 comprising a screen 110. The display device 108 may form part of any type of device comprising a screen, for example a television or a monitor. In some implementations, the display device 108 may form part of a portable device. Some examples of portable devices may include a phone, smart phone, tablet, PDA, laptop, an electronic reading device (e-reader), etc. In operation, the screen 110 of the display device 108 may output or transmit at least one range of wavelengths 112 corresponding to content displayed on the screen 110.

The screen 110 may form part of a liquid crystal display (LCD), a light emitting diode (LED) display, an organic LED (OLED), a plasma display, a cathode ray tube (CRT), or any similar display. The content displayed on the screen 110 may comprise any form of content, for example an image, video, electronic book (e-book), software program, video game, etc. When content is displayed on the screen 110, the screen may transmit the at least one range of wavelengths as transmitted light 112. The at least one range of wavelengths may correspond to a first color displayed on the screen 110. The first color displayed on the screen 110 may further correspond to a first display primary.

The at least one range of wavelengths may comprise a plurality of ranges of transmitted wavelengths. In some implementations, the plurality of ranges of wavelengths may comprise a first transmitted range of wavelengths, a second transmitted range of wavelengths, and a third transmitted range of wavelengths. In some implementations, additional ranges of wavelengths may also be transmitted from the screen 110. For example, a fourth transmitted range of wavelengths and a fifth transmitted range of wavelengths may be transmitted from the screen 110. The number of ranges of wavelengths transmitted from the screen 110 may vary among the various implementations.

Each of the plurality of ranges of transmitted wavelengths may correspond to a color displayed on the screen 110. For example, the second transmitted range of wavelengths may correspond to a second color, and the third transmitted range of wavelengths may correspond to a third color. Each of the second color and the third color may further correspond to a second display primary and a third display primary, respectively. Each of the plurality of ranges of wavelengths may be transmitted as the transmitted light 112 and received by the at least one optical element 106.

The first, second, and third display primaries may correspond to a set of light sources configured to transmit wavelengths of light. Though three display primaries are discussed herein, the number of display primaries may vary, for example 4, 5, 6 or any number of display primaries. Light emitted from each set of light sources may be combined in varying proportions to create a wide range of colors. A set of light sources and corresponding display primaries may be operable to emit wavelengths of light and may comprise any form of lighting implemented to light a screen of a display device. For example, the light sources may comprise a backlight and/or pixels, and in some exemplary implementations, may comprise LED backlights and/or OLED pixels. Wavelengths of light may also be generated by one or more filters. For example, an array of color filters may be operable to selectively allow light from a plurality of display primaries and/or light sources to pass to a screen of a display device. In some implementations, a backlight may be applied to provide light to a set of light sources. For example, a backlight may comprise a backlight configured to generate white or RGB light. In some implementations, a backlight may be sequentially driven by a set of light sources. The various implementations described herein may be combined in various ways to emit wavelengths of light from a screen of a display device.

When viewing a screen, such as the screen 110 of the display device 108, ambient light 114 may be emitted from various sources in a local environment. The ambient light 114 may correspond to light from the sun, and nearby light sources including incandescent, fluorescent, high-intensity discharge, LED sources, etc. The ambient light 114 may be reflected from the screen 110 generating ambient interference 116. The ambient interference 116 may interfere with the transmitted light 112. The ambient interference 116 may comprise a wide range of wavelengths that may overlap the plurality of ranges of transmitted wavelengths from the screen 110.

When viewing a screen without enhancement, the ambient interference may diminish a perceived brightness and clarity of the transmitted light 112. The at least one optical element 106 may be operable to filter received light. The at least one optical element 106 may limit the transmission of the ambient interference 116 while allowing the transmitted light 112 to be transmitted as perceived light 118. The perceived light 118 may appear to be brighter and clearer to a viewer than when viewing the transmitted light 112 from the screen 110 without enhancement. In at least this way, the eyewear device may improve the perceived contrast of the screen 110.

Figure 2:
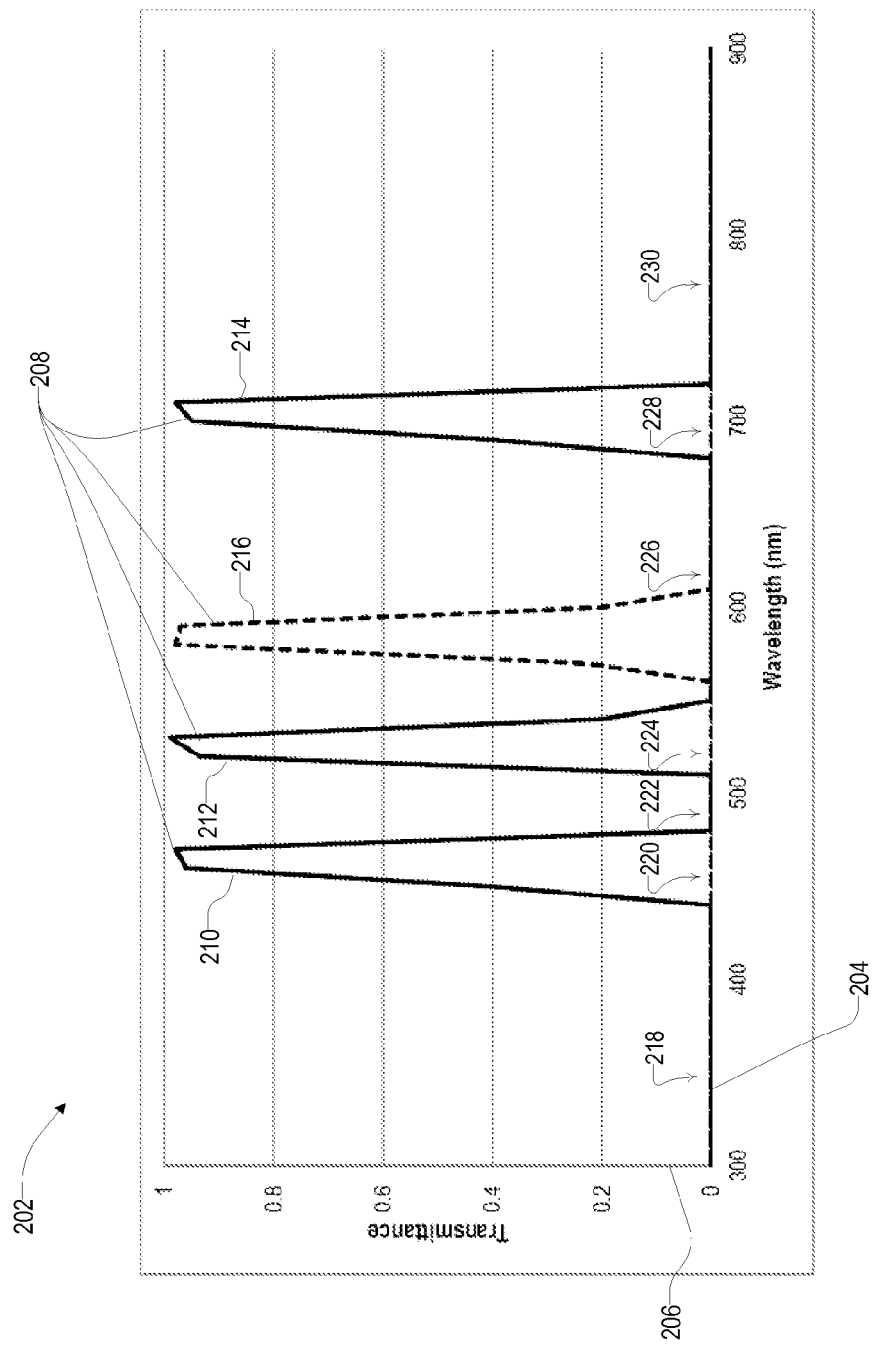
FIG. 2 is an example of a diagram demonstrating a plurality of transmitted wavelengths corresponding to a plurality of filter passbands for the system of FIG. 1.

Referring to FIG. 2, an example of a diagram demonstrating a plurality of transmitted wavelengths corresponding to a plurality of filter passbands is shown for the system of FIG. 1. FIG. 2 may demonstrate a plurality of filter parameters corresponding to optical wavelengths in nanometers (nm) 204 and a transmittance of the wavelengths 206. A plurality of filter passbands 208 may correspond to a plurality of transmitted wavelengths from a screen, for example the screen 110 of the display device 108.

In this example, the transmitted light may correspond to a plurality of ranges of transmitted wavelengths. A plurality of filter passbands 208 of an at least one optical element may be operable to pass light corresponding to the plurality of ranges of transmitted wavelengths. Each of the ranges of transmitted wavelengths may correspond to a color transmitted from a display primary of a screen of a display device. For example, a first display primary may generate blue light at a wavelength ranging from 430 to 500 nm. The light generated by the first display primary may correspond to a first transmitted range of wavelengths. The at least one optical element may be operable to transmit light through a first passband 210 corresponding to the first transmitted range of wavelengths to improve a perceived contrast of content displayed on a video screen.

A display primary may correspond to a light source of a display device. A display device may be operable to transmit light corresponding to a visible light range. The light transmitted may correspond to a plurality of colors. Each of the plurality of colors may be emitted by a display primary. For example, a screen of a display device may transmit content by blending the colors red, green, and blue (RGB). Each of the colors may correspond to a wavelength of light and may originate from a display primary of the display device. A first display primary may generate a blue light. A second display primary may generate a green light and a third display primary may generate a red light.

Each of the plurality of passbands 208 may correspond to a display primary of a display device. The first passband 210 may correspond to the color blue. A second passband 212 may correspond to the color green at a wavelength ranging from 520 to 570 nm. A third passband 214 may correspond to the color red at a wavelength ranging from 630 to 730 nm.

Each of the passbands may correspond to one or more optical filters. The one or more optical filters may comprise a plurality of coatings, layers, lenses or various optical filters incorporated in at least one optical element. The at least one optical element may be operable to pass wavelengths corresponding to each of the passbands 210, 212, and 214 to improve a perceived contrast. The perceived contrast may be improved by blocking wavelengths of ambient interference outside the ranges corresponding to the first, second, and third passbands 210, 212, and 214. Light corresponding to each of the passbands may be transmitted through at least one optical element as perceived light.

Though the colors red, green, and blue are discussed herein, the plurality of ranges of transmitted wavelengths of the plurality of passbands 208 may be operable pass light of any color through at least one optical element while blocking light outside the range of the first, second, and third passbands 210, 212, and 214. The display primaries may also correspond to any color of light. In an exemplary implementation, each of the plurality of passbands 208 may correspond to a color of light generated by a display primary. An at least one optical element may comprise a plurality of passbands, each of the passbands having a center frequency corresponding to a range of wavelengths transmitted from a display primary of a display device.

In some implementations a fourth display primary may generate yellow light. A fourth passband 216 may correspond to the fourth display primary at a wavelength ranging from 550 to 600 nm. A fifth and/or sixth display primary may further be applied in a display device to generate a color(s) of light. An at least one optical element may also comprise a fifth passband and/or a sixth passband. The fifth and/or the sixth passband may be configured to transmit or pass light through the optical element corresponding to the colors of light of the fifth and/or sixth display primaries while blocking ambient light interference.

Each of the passbands of the plurality of passbands 208 may comprise any optical filter, plurality of coatings, layers, plurality of layers of optical filter, or combination of filters operable to pass a range of wavelengths, for example a band-pass filter or narrow band-pass (narrow-band) filter comprising a plurality of passbands. Some examples of narrow-band filters may comprise ultra-high contrast (UHC), Oxygen-III & Hydrogen-beta, and Hydrogen-alpha filters. Additional example of filters may include absorptive, dichroic, thin-film, and/or interference filters. Each of the passbands of a filter of an at least one optical element may have a centering frequency and bandwidth corresponding to a range of wavelengths of light generated by a display primary of a screen of a display device.

The bandwidth and cornering frequency of each of the passbands may vary. The center frequency, bandwidth and corner frequency of each of the passbands may depend on a particular application. In some implementations, at least one optical element may further comprise at least one secondary filter. The at least one secondary filter may be configured to block light outside the visible light range, for example ultraviolet light, UVA, UVB, etc.

The at least one optical element may comprise any lens and/or an optical filter. The lens and/or an optical filter may comprise a plurality of layers or coatings. Each of the plurality of layers or coatings may be operable to pass light corresponding to a plurality of ranges of transmitted wavelengths and block and/or reflect ambient interference outside of the plurality of ranges of transmitted wavelengths. The terms block and/or reflect may refer to limiting a transmittance of light through the at least one lens and/or optical filter. The transmittance of light through the at least one lens and/or optical filter may be limited by absorbing, reflecting, destructively cancelling, or otherwise limiting the transmittance of ambient interference. Various manufacturing techniques may affect performance characteristics of the plurality of passbands. Performance characteristics may include the centering frequency, transmittance, and corner frequency of each of the plurality of passbands of an optical filter.

In an exemplary implementation, at least one optical element may be operable to block light over a first blocked range of wavelengths 218. The at least one optical element may be operable to pass or transmit light at a first transmitted range of wavelengths 220. The first transmitted range of wavelengths 220 may be greater than the first blocked range of wavelengths 218. The at least one optical element may further be operable to block light at a second blocked range of wavelengths 222. The second blocked range of wavelengths 222 may be greater than the first passed range of wavelengths 220. The combination of the first blocked range of wavelengths 220, the first passed range of frequencies 222, and the second blocked range of wavelengths may correspond to the first passband 210.

The at least one optical element may further be operable to pass or transmit light at a second transmitted range of wavelengths 224. The second transmitted range of wavelengths 224 may be greater than the second blocked range of wavelengths 222. The at least one optical element may further be operable to block light at a third blocked range of wavelengths 226. The third blocked range of wavelengths 226 may be greater than the second transmitted range of wavelengths 224. The combination of the second blocked range of wavelengths 222, the second transmitted range of wavelengths 224, and the third blocked range of wavelengths 226 may correspond to the second passband 212.

The at least one optical element may further be operable to pass or transmit light at a third transmitted range of wavelengths 220. The third transmitted range of wavelengths 228 may be greater than the third blocked range 226. The at least one optical element may further be operable to block light at a fourth blocked range of wavelengths 230. The third blocked range of wavelengths may be greater than the third transmitted range of wavelengths 228. The combination of the third blocked range of wavelengths 226, the third passed range of frequencies 228, and the fourth blocked range of wavelengths 230 may correspond to the third passband 214.

Additional passbands, for example a fourth, fifth, or sixth passband, may have similar properties of the first, second and third passbands 210, 212, and 214. The additional passbands may be combined with the plurality of passbands 208. In some implementations, each of the additional passbands may correspond to a narrow-band filter having a center frequency greater than, less than, or between any of the plurality of ranges of transmitted wavelengths discussed above.

Referring to FIG. 3, an example of a system 302 for improving a perceived contrast of a screen is shown in accordance with the disclosure. The system may comprise an eyewear device 304 comprising at least one optical element 306. The eyewear device 304 may comprise any device having the at least one optical element 306 and in some implementations may be combined with the optical device 104. The at least one optical element 306 may comprise a shutter that may be operable to vary a transparency of the at least one optical element 306. The shutter may comprise a transparent liquid crystal layer that may become opaque in response to an applied voltage, for example an LCD shutter lens. The shutter may be in communication with a control circuit 308.

The eyewear device 304 may be configured to operate in conjunction with a display device 310 comprising a screen 312. The display device 310 may comprise any type of device comprising a screen, for example a television or a monitor. In some implementations, the display device 310 may comprise a portable device. Some examples of portable devices may comprise a phone, smart phone, tablet, PDA, laptop, an electronic reading device (e-reader), etc. In operation, the screen 312 of the display device 310 may display content (e.g. video, images, etc.) by illuminating the screen 312 at a timing that may generate a first pattern of light. The first pattern of light may correspond to a temporal pattern comprising any timing, frequency, or pattern of light emitted from the screen 312 (e.g. a temporal pattern of pulsed image emissions).

The display device 310 may further comprise a transmitter 313 operable to transmit a first signal 314 corresponding to the first pattern of light. The first signal 314 and the corresponding first pattern of light may be activated by one or more processors of the display device 310 in response to a user setting. The first signal and the corresponding first pattern of light may also be activated in response to a signal transmitted from the control circuit 308 of the eyewear device 304. In various implementations, the control circuit and the display device may be operable to communicate wirelessly and activate complementary functions in each other. For example, the display device may be operable detect at least one signal from the control circuit and enter a mode activating the first pattern of light and a corresponding first signal. The pattern of light emitted from the screen 312 may correspond to a temporal pattern of emission and non-emission of the light.

The first signal 314 may be received by a receiver 316 of the control circuit 308. The processor 318 of the control circuit 308 may be operably coupled to the receiver 316. The processor 318 may be operable to receive the first signal corresponding to the first pattern of light. The processor 318 may be operable to determine the timing of the first pattern of light from the first signal. The transmitter 313 and the receiver 316 may comprise a wireless interface. The wireless interface may comprise any form of wireless communication, for example a radio signal, Bluetooth, personal area networks, IEEE 802.11 a,b,g,n, etc.

The processor 318 may further be in communication with a shutter control 320. The shutter control 320 may comprise a circuit operable to output a second signal 322 that may activate a liquid crystal layer of the at least one optical element 306. The second signal may comprise a voltage corresponding to the first pattern of light emitted from the screen 312. In response to a first level of voltage of the second signal 322 from the shutter control 320, the liquid crystal layer of the at least one optical element 306 may become opaque. In response to a second level of voltage of the second signal 322 from the shutter control 320, the liquid crystal layer of the at least one optical element 306 may increase in transparency. Changing between voltage levels of the second signal, in response to the first signal 314, may generate a varying transparency of the at least one optical element 306.

The varying transparency of at least one optical element 306 may correspond (e.g. be synchronized) or temporally synchronized to the first pattern of light transmitted from the screen 312. When the screen 312 is illuminated, the voltage of the second signal 322 may be low, corresponding to the at least one optical element 306 being transparent. When the screen 312 is between illumination cycles, for example when the screen 312 is not illuminated, the voltage of the second signal 322 may be high corresponding to the at least one optical element 306 being opaque. In operation, the control circuit 308 of the eyewear device 304 may receive the first signal 314 from the display device 310 and generate the second signal 322 to align the timing of the illumination of the screen 312 with the timing of the transparency of the at least one optical element 306.

By illuminating the screen 312 and making transparent the at least one optical element 306 during the same time periods, light corresponding to the first pattern of light may pass through the at least one optical element 306. When the screen 312 is not illuminated, the at least one optical element 306 may be opaque and block ambient interference from passing through the at least one optical element 306. In this way, the eyewear device 304 may provide for light corresponding to the first pattern of light to reach a viewer while blocking a significant amount of ambient interference. The eyewear device 304 may provide for improving a perceived contrast of a screen of a display device by limiting ambient interference and allowing light transmitted from the screen to pass through at least one optical element.

The control circuit 308 may further comprise a feedback sensor 324 operably coupled to the processor 308. The feedback sensor 324 may be operable to detect measured timing characteristics 326 of the varying transparency of the at least one optical element 306, for example the transparency of an LCD shutter. The measured timing characteristics 326 may be communicated to the processer 308 from the feedback sensor 324.

The processor 308 may compare the measured timing characteristics of the at least one optical element 306 to the timing characteristics of the first signal 314. During operation, the processor may adjust the second signal of the shutter control to ensure that the transparency of the at least one optical element corresponds to the first pattern of light of the screen 312 of the display device 310. The adjustment of the second signal by the processor in response to the measured timing characteristics may form a feedback loop. Further details of the feedback loop are discussed in reference to FIG. 4b.

In some implementations, a feedback sensor may be operable to measure the first pattern of a display device, for example the display device 310. The measured timing characteristics of the first pattern of light may be communicated to a processor from the feedback sensor. For example, the processer 308 may receive the timing characteristics of the first pattern of light from the feedback sensor 324. The measured timing characteristics of the feedback sensor may be applied to adjust or control the timing of a second signal operable to control the varying transparency of at least one optical element.

The processor may further be operably connected to a power source 326. The power source may comprise any type of power source or battery. For example, the power source 326 may comprise a single use or rechargeable battery (e.g. Nickel-cadmium, nickel metal hydride, lithium ion, etc.). In some implementations the power source 326 may comprise a power supply, for example a direct current (DC) power supply. In some implementations, the device with the screen may detect the glasses (e.g. by a signal from the glasses) and automatically go into a power saving mode, where the power saving mode may change display parameters reduce power usage, some examples may include reducing the brightness, contrast, update frequency, and/or the color palette.

By limiting ambient interference, the eyewear device 304 may provide for significant energy savings and improved battery life of the display device 310. Typically when viewing a display in environments having significant ambient light, the brightness of the display will be increased and cause energy usage to increase. The eyewear device may limit the ambient light perceived by a viewer of a screen and provide for the screen be perceived as being brighter than when viewed without the eyewear device 304.

Referring to FIGS. 1 and 3, the eyewear device 104 may comprise a control circuit and a liquid crystal layer incorporated in the at least one optical element 106. The varying transparency of the at least one optical element may be implemented in combination with a plurality of passbands of an optical filter, similar to those discussed in reference to FIG. 2. Each of the plurality of passbands may correspond to a passband of light. Light corresponding to a passband may be transmitted through at least one optical element. Various combinations of optical filters and the liquid crystal layer may provide for enhancement of a perceived contrast of a screen of a display device. The combination of the varying transparency generated by the control circuit and the blocking of the ambient interference by the optical filter may significantly limit the brightness necessary to clearly view a screen in the presence of ambient light. Limiting the brightness of the screen may further limit an energy consumption of the display device.

In some implementations a display device may illuminate a first group of display primaries during normal operation and a second group of display primaries in response to an input received by the display device. The input received by the display device may comprise a user input corresponding to a screen setting that may adjust an illumination of the screen. The screen setting may also adjust a color, brightness, or timing of an illumination of a screen. In some implementations the first group of display primaries may comprise display primaries that are optimized for viewing a screen of a display device without the aid of an eyewear device (e.g. 104, 304). The second group of display primaries may comprise display primaries that are optimized for viewing a screen of a display device with the aid of an eyewear device (e.g. 104, 304).

In some implementations, a first group of display primaries may correspond to a white backlight while a second group of display primaries may correspond to a monochromatic (e.g. red-orange) backlight. A first group of display primaries may correspond to a white backlight while a second group of display primaries may correspond to set of LEDs, each of the LEDs corresponding to a color (e.g. RGB). In yet another implementation, the second group of display primaries may correspond to a subset of the first group of display primaries. For example, more display primaries may be configured to emit light when viewing a display without an eyewear device (e.g. 104, 304). By selectively activating a first group of display primaries and a second group of display primaries, energy consumption of a display device may be limited while providing an enhanced view of a screen.

Referring to FIG. 4*a*, an example of a timing diagram 402 of a system for improving a perceived contrast of a screen is shown in accordance with the disclosure. A screen signal 404 may correspond to timing characteristics of a screen of a display device. A high screen signal 408 may correspond to a lighting source (e.g. a display primary, backlight, etc.) of the screen being active, for example a period of time when the screen is illuminated and transmitting light. A low screen signal 410 may correspond to a period of time when the screen is inactive and light is not being transmitted from the screen.

A shutter timing signal 412 may correspond to measured timing characteristics of at least one optical element. A high shutter signal 414 may correspond to a period of time when the at least one optical element is transparent. For example, a high shutter signal 414 may correspond to a period of time when voltage is not supplied to a liquid crystal layer of the at least one optical element. A low shutter signal 416 may correspond to a period of time when the at least one optical element has limited transparency or is opaque. For example, the low shutter signal 416 may correspond to a period of time when voltage is applied to a liquid crystal layer of at least one optical element.

Though the terms transparent and opaque are used herein, various levels of transparency and opacity may be applied in accordance with the disclosure. For example, an at least one optical element may have a transparency ranging from 10% to 100% during a high shutter signal. The at least one optical element may have a transparency ranging from 0% to 90% during a low shutter signal (e.g. when voltage is applied to the shutter). As such, the terms transparent (higher transparency) and opaque (lower transparency) may correspond to the relative transparency of at least one optical element as the transparency varies over time.

In one example, an at least one optical element may vary from 100% transparency, in response to high shutter signals, to 0% transparency in response to low shutter signals. In another example, the transparency of an at least one element may be 80% transparency in response to a high shutter signal and 15% in response to a low shutter signal. In general, the percentage of transparency or transmittance of an at least one optical element may be higher during high shutter signals and lower during low shutter signals. The terms transparent and opaque as used herein may correspond to the relative transparency of at least one optical element as the transparency of the at least one optical element varies over time.

In one implementation the at least one optical element may comprise a shaded lens, for example a lens similar to that found in sunglasses. The maximum transparency of the at least one optical element may be the transparency of the shaded lens, while the minimum transparency (maximum opacity) may decrease, darken, or cause the at least one lens to become visually opaque. The varying transparency of the at least one lens may prevent substantial ambient interference from being transmitted through the at least one lens while allowing the content displayed on the screen to be transmitted through the at least one optical element.

In reference to the implementation of FIG. 3, the timing diagram 402 may illustrate a timing of at least one optical element 306 being transparent during a corresponding time of a screen 312 being illuminated. The timing diagram 402 may illustrate a method of illuminating the screen 312 of the display device 310 corresponding to a first pattern of light. The display device 310 may transmit a first signal 314 corresponding to the first pattern of light of the screen 312. The first signal 314 may be received by a control circuit 308 of an eyewear device 304. A shutter of at least one optical element 306 of the eyewear device 304 may vary in transparency in response to a second signal 322 received from the control circuit 308. The first signal 314 may correspond to a lighting signal 404 of the screen 312. The varying transparency of the at least one optical element 306 may correspond to the shutter timing signal 412.

Referring to FIG. 4*b*, an example of a timing diagram 452 demonstrating a timing correction of a system for improving a perceived contrast of a screen is shown in accordance with the disclosure. In some implementations, a control circuit of an eyewear device, similar to that introduced in FIG. 3, may be operable to detect measured timing characteristics of a varying transparency of at least one optical element. A lighting signal 454 may correspond to the timing characteristics of the screen 312 of the display device 310 and the first signal 314.

A high screen signal 458 may correspond to a period of time when a lighting source is illuminated. A low screen signal 460 may correspond to a period of time when the screen is inactive and light is not being transmitted from the screen. A shutter timing signal 462 may correspond to measured timing characteristics of at least one optical element. A high shutter signal 464 may correspond to a period of time when the at least one optical element has an increased transparency. A low shutter signal 466 may correspond to a period of time when the at least one optical element has a decreased transparency or is opaque.

A timing error 468 may illustrate a delay in the period of time when the shutter timing signal 462 is high relative to a period of time when the screen lighting signal 454 is high. A feedback sensor of the control circuit of an eyewear device may monitor the measured timing characteristics of the shutter timing signal 462 in comparison to the screen lighting signal 454. In some implementations, the feedback sensor may be an optical sensor operable to measure opacity of the lens, light transmission from the screen, timing of the control signal or any combination of the above. The timing error 468 may cause an eyewear device to block content displayed on a screen due to an optical element being opaque when a screen is illuminated. If the periods of time when the shutter timing signal 462 and the lighting signal 454 are high do not correspond, a perceived contrast may decrease.

In the various implementations, the feedback sensor may comprise any form of sensor operable to provide feedback to a display device or a control circuit of an eyewear device. In some implementations, a feedback sensor may detect the opacity of an LCD shutter, a voltage applied to activate an LCD shutter, light corresponding to the opacity of the LCD shutter, and/or light emitted as a first pattern of light from a screen of a display device. In the various implementations, the feedback sensor may comprise a variety of sensors. A feedback sensor may for example comprise an analog or digital input to the control circuit, an optical sensor, a photo-electric sensor, a photo-resistor, LED, a charge coupled device, active pixel sensor, etc., or any other form of sensor operable to detect changes in light or voltage.

In reference to the example discussed in FIG. 3, the shutter timing signal 462 may correspond to the measured timing characteristics of the varying transparency of at least one optical element 306. If a timing error 468 is detected the processor 318 of the control circuit 306 may be operable to correct 470 the shutter timing signal 462. The shutter timing signal 462 may be corrected by adjusting a timing of the second signal 322. By correcting the timing error 468, the transparency of the at least one optical element 306 may be aligned with the illumination of the screen 312 to improve a perceived contrast of the screen.

The screen lighting signals 404 and 454 and the shutter timing signals 412 and 462 may comprise corresponding pulses at a rate of approximately 60 Hz. The corresponding pulses may comprise corresponding high screen lighting pulses and high shutter timing pulses. In some implementations the corresponding pulses may occur at any frequency, for example 30, 50, 100, 120, 200, or 240 Hz. In some exemplary implementations, the corresponding pulses may occur at any frequency that is greater than or equal to a visually perceivable frequency, for example 60 Hz or greater.

Figure 5:
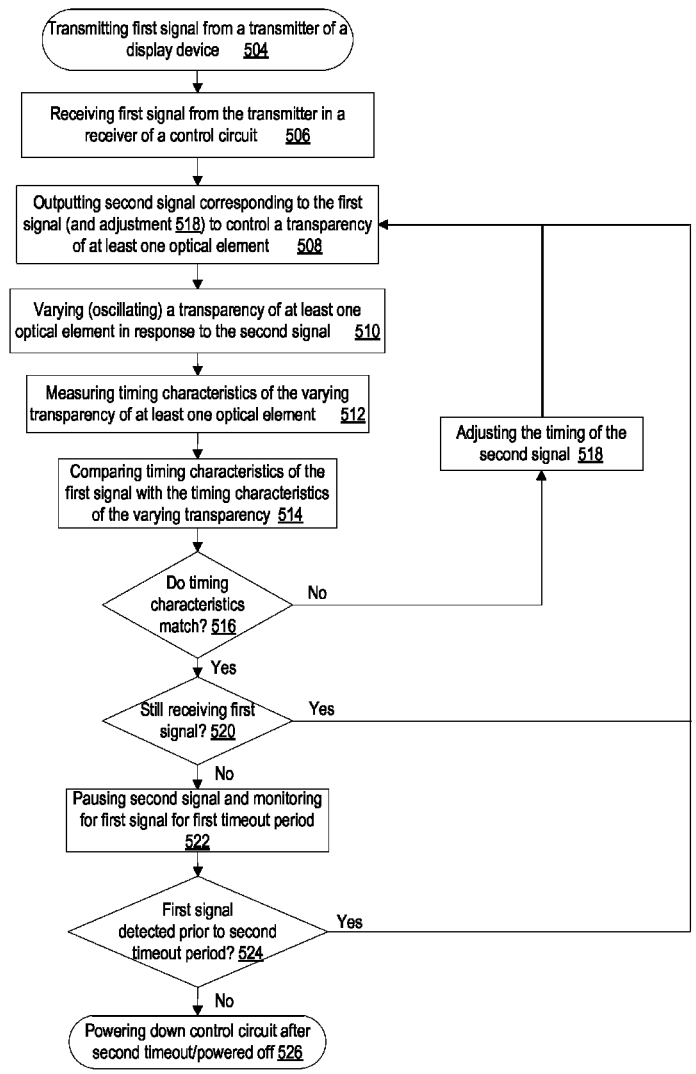
FIG. 5 is an example of a flowchart demonstrating a method for improving a perceived contrast of the screen.

Referring to FIG. 5, an example of a flowchart demonstrating a method 502 for improving a perceived contrast of the screen is shown in accordance with the disclosure. The method 502 may begin by activating a screen of a display device. Once the screen is activated, the screen may begin to display content. The content may be displayed in a first pattern of light. The display device may transmit a first signal from a transmitter of the display device (504). The first signal may be received by a receiver of a control circuit (506). The control circuit may comprise a component of an eyewear device. The control circuit may output a second signal in response to the receipt of the first signal to control the transparency of at least one optical element of the eyewear device (508). In response to the second signal, the transparency of a shutter device of the at least one element may vary (510).

In some implementations, measured timing characteristics of the varying transparency of the at least one optical element may be measured (512). The measured timing characteristics may be detected by a sensor in communication with the control circuit. The control circuit may then compare the timing characteristics of the first signal with the measured timing characteristics detected by the sensor (514). The control circuit may then determine if the timing characteristics of the first signal match the measured timing characteristics (516). If the timing characteristics do not match, the control circuit may adjust the timing of the second signal (518). The control circuit may continue to monitor the measured timing characteristics and update the second signal to ensure that the timing characteristics of the first signal match the measured timing characteristics.

If the timing characteristics of the first signal match the measured timing characteristics, the control circuit may continue to monitor the first signal to determine if the first signal is being received (520). If the first signal being received, a control circuit may continue to output the second signal (508). If a control circuit determines that the first signal has not been received for a first timeout period, the output of the second signal may be paused (522). The control circuit then may continue to monitor a receiver for the receipt of the first signal for a second timeout period (524).

In response to the receipt of the first signal, the method may return to step 508. If the first signal is not received within the second timeout period, the control circuit power may down or enter a sleep mode (526). The first timeout period and the second timeout period may correspond to a user specified or predefined durations of time. The method 502 may provide for a perceived improvement in the contrast of a screen in the presence of ambient light.

Figure 6:
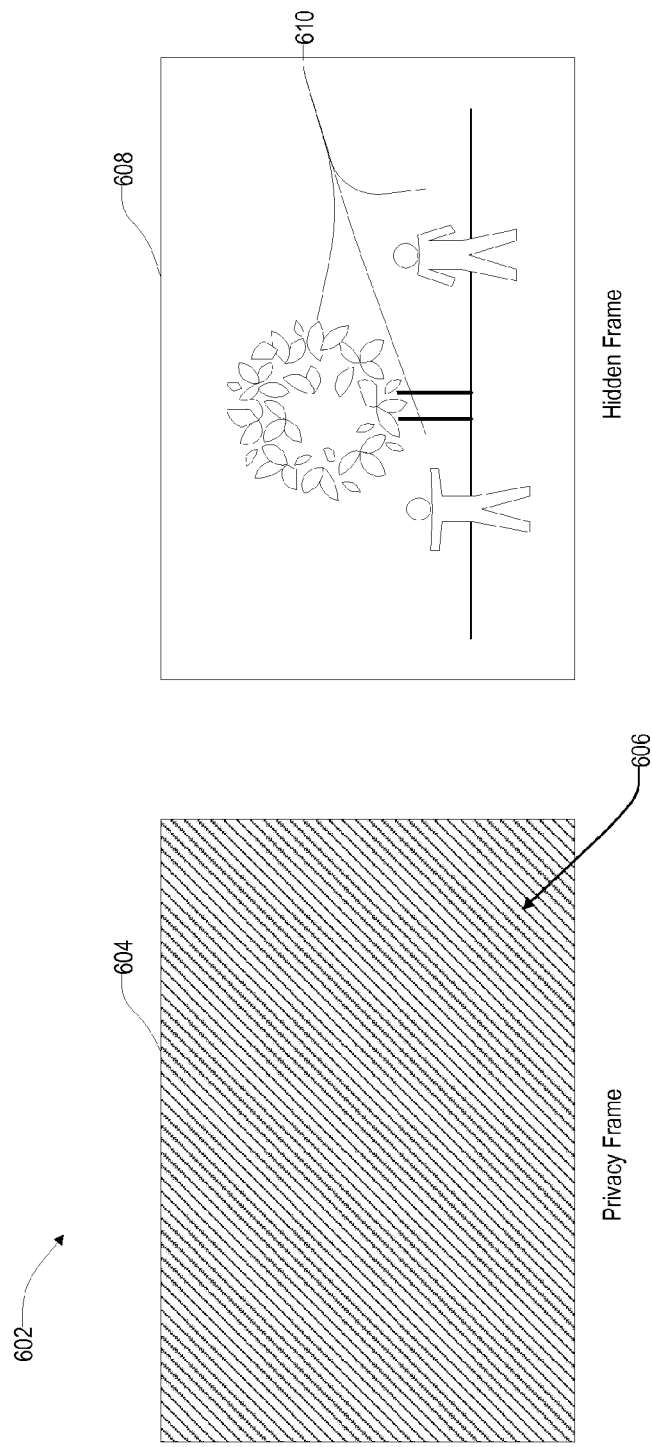
FIG. 6 is an example of a system for privately viewing an image displayed on a video screen.

Referring to FIG. 6, an example of a diagram 602 demonstrating a method for privately viewing an image displayed on a video screen is shown in accordance with the disclosure. In some implementations, a privacy frame 604 may be displayed on the screen of a display device. The privacy frame 604 may display at least one mask 606 that may be applied to mask or hide a hidden frame 608. The hidden frame 608 may comprise a plurality of images and/or video frames comprising content 610 that may be viewed privately when viewed through an eyewear device.

The eyewear device may be similar to the eyewear device 304 introduced in FIG. 3. The eyewear device may further be implemented in combination with the eyewear device 104 introduced in FIG. 1. The eyewear device may comprise a control circuit operable to receive a first signal from the display device, similar to the eyewear device 304. The privacy frame 604 may be displayed on a screen of the display device, for example, the screens 110 and 312. The hidden frame 608 may further be displayed on the screens.

In operation, the display device may be operable to alternate between the privacy frame 604 and the hidden frame 610 by changing the display of a screen in a timing pattern. The timing pattern may comprise a first timing pattern corresponding to the hidden frame 610 and a second timing pattern corresponding to the privacy frame 604. The first timing pattern may correspond to an intermittent display of the hidden frame on a screen that may alternate with the intermittent display of the privacy frame at the second timing pattern.

In some implementations, the timing pattern may comprise an encoding pattern that may vary one or more sequences or timings of the first timing pattern and the second timing pattern. The encoding pattern may provide for the content 610 to be displayed at a first timing pattern that varies to provide secure viewing of the content 610. The encoding pattern may prevent other devices, such as unpaired eyewear devices, from being operable to view the content 610. An eyewear device in communication a display device may be operable to receive the encoding pattern (e.g. a timing key indicating the timing of each pulse, where the transmission pulses may have varying durations and start times, and where the timing key may change periodically, on command, or continuously during transmission) allowing the eyewear device to decode (e.g. synchronize with) the first timing of the hidden frame for viewing.

The content 610 of the hidden frame 608 may comprise any form of content, for example an image, video, electronic book (e-book), software program, video game, etc. The mask 606 of the privacy frame 604 may comprise any pattern, screensaver, image, video, advertisement, or any other form of content. In an exemplary implementation, the mask 606 may comprise a high contrast image, pattern, or any other form of visually distracting, moving, and/or repeating pattern. In some implementations, the mask 606 may comprise an additive inverse of the content 610 of the hidden frame 608. The mask 606 may resemble a uniform image that is configured to disguise the content. In some implementations, the mask may distract from or completely hide the content of the hidden frame 610 from a viewer without a paired eyewear device in communication with the display device.

Figure 7:
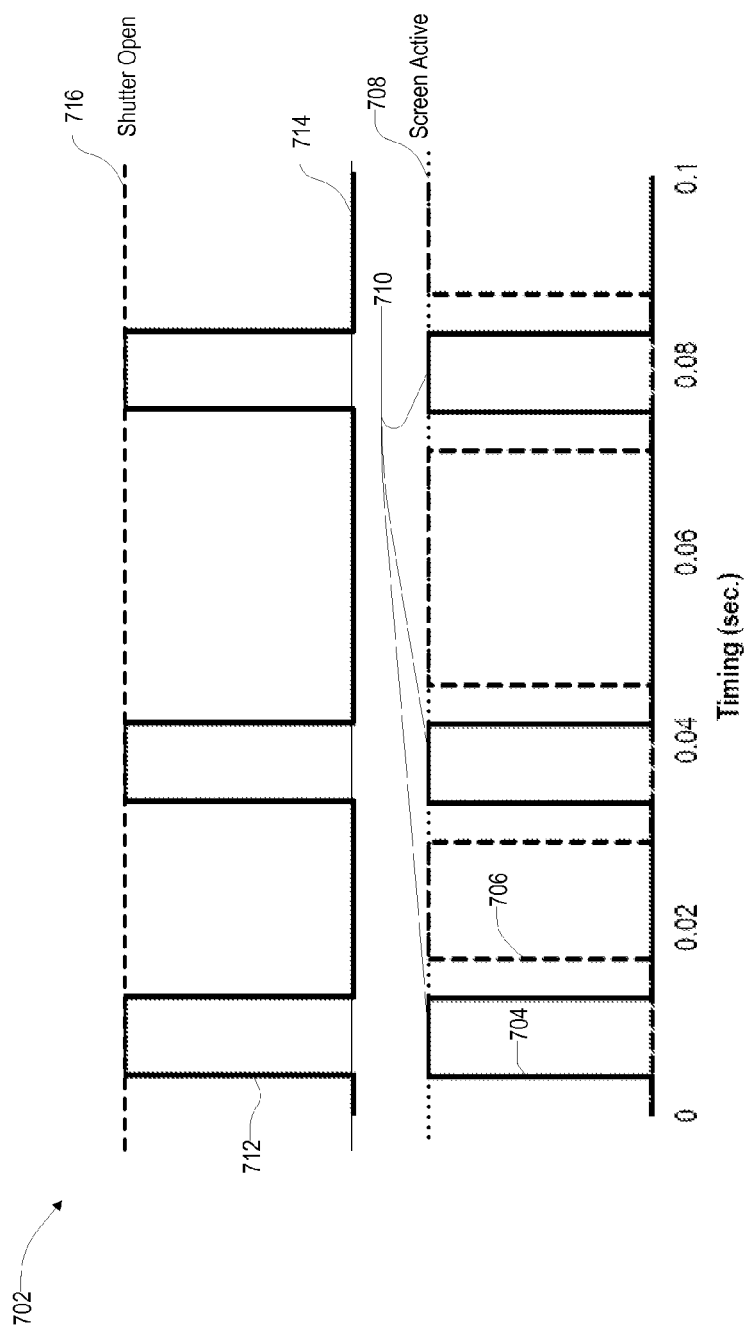
FIG. 7 is an example of a timing diagram demonstrating a method for privately viewing an image displayed on a video screen.

Referring to FIG. 7, an example of a timing diagram 702 demonstrating a method for privately viewing an image displayed on a video screen is shown in accordance with the disclosure. A first timing signal 704 may correspond to a timing of the display of a hidden frame, for example, the hidden frame 608. A second timing signal may correspond to a timing of the display of a privacy frame, for example the timing frame 604. A high signal 708 of the first timing signal 704 may correspond to a hidden frame being displayed on a screen of a display device. A high signal of the second timing signal 706 may correspond to a privacy frame being displayed on the screen of the display device.

In some implementations, the first timing signal may vary to provide secure viewing of the content 610. The frequency, period, and the order of the first timing pattern and the second timing pattern may comprise an encoding pattern. In this example, the period to the second timing pattern may vary. The varying period of the second timing pattern 706, may cause the frequency of the first timing pattern 704 to vary. The varying of the first timing pattern may generate an encoded timing pattern 710. The first timing pattern may correspond to a first signal, for example, the first signal 314. The first signal may be transmitted from a transmitter in communication with display device.

The first signal from the display device may be received by a control circuit of an eyewear device, for example the eyewear device 304. In response to the receipt of the first signal, the control circuit may generate a second signal 712. The second signal 712 may control a varying transparency of at least one optical element, for example the at least one optical element 306. A high second signal 714 may correspond to the at least one optical element being transparent. For example, the high second signal 714 may correspond to a liquid crystal layer of the at least one element having an increased transparency (e.g. a shutter being open). A low signal 716 may correspond to the liquid crystal layer of the at least one optical element being opaque (e.g., having a decreased transparency or a shutter being closed).

In operation, the varying transparency of the at least one optical element may cause the at least one optical element to be transparent during time periods when the hidden frame is displayed on the display device. The shutter may be opaque or closed when the privacy frame is displayed. By aligning the transparent time period of the at least one optical element with the display of the hidden frame, the at least one optical element may provide for viewing of the hidden frame while masking the privacy frame from view.

The first timing pattern 704, the second timing pattern 706, and the second signal 712 may correspond to signals comprising corresponding pulses at an average rate of approximately 60 Hz. In some implementations the corresponding pulses may occur at any average frequency, for example 30, 50, 100, 120, 200, or 240 Hz. In some exemplary implementations, the corresponding pulses may occur at a frequency that is greater than or equal to a visually perceivable frequency, for example 60 Hz or greater.

Figure 8:
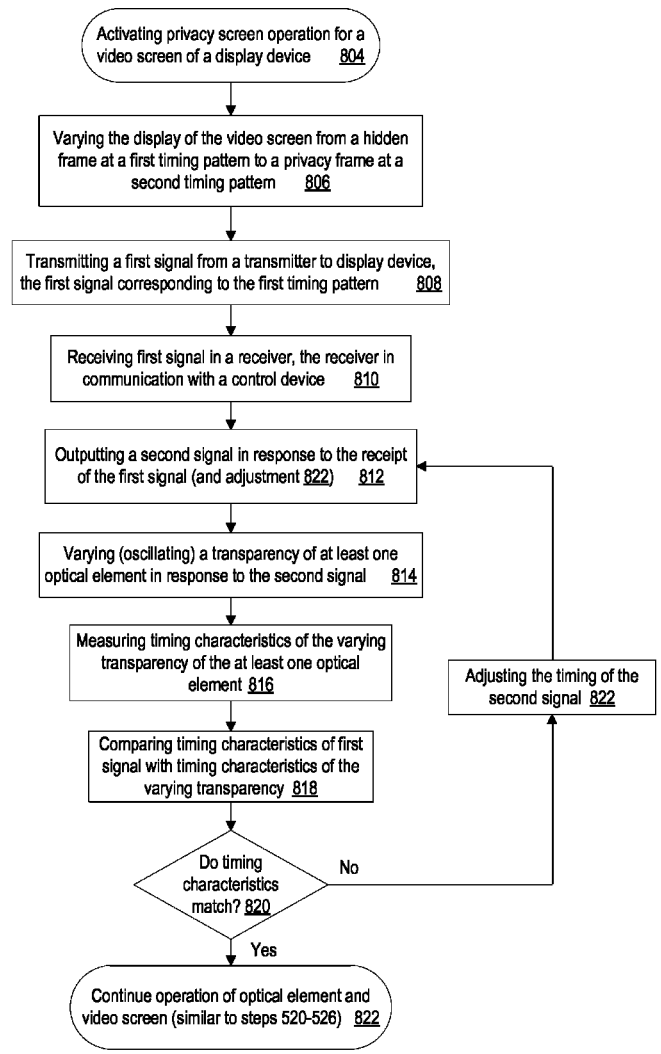
FIG. 8 is an example of a flowchart demonstrating a method for privately viewing an image displayed on a video screen in accordance with the disclosure.

Referring to FIG. 8, an example of a flowchart demonstrating a method 802 for privately viewing an image displayed on a video screen is shown in accordance with the disclosure. The method may begin in response to a privacy screen operation of a display device being activated (804). The privacy screen operation may be activated in response to one or more user settings. In some implementations, the privacy screen operation may be activated in response to a signal from a control circuit of an eyewear device. Once activated, the display device may begin varying the display of a screen of the video display. The screen may display a hidden frame at a first timing pattern and a privacy frame at a second timing pattern (806).

A first signal may be transmitted from a transmitter in communication with the display device (808). The first signal may correspond to the timing of the first timing pattern. The first signal may be received by a receiver (810). The receiver may be in communication with a control circuit of an eyewear device. In response to receiving the first signal, the control circuit may output a second signal (812). The control circuit may be operably coupled to at least one optical element. The at least one optical element may comprise a shutter device, for example a liquid crystal layer in communication with the control circuit. The shutter device of the at least one optical element may vary in transparency in response to the second signal (814).

In some implementations, the control circuit may measure the timing characteristics of the varying transparency of the at least one optical element (816). The measured timing characteristics may be detected by a sensor in communication with the control circuit. The control circuit may then compare the timing characteristics of the first signal with the measured timing characteristics detected by the sensor (818). The control circuit may then determine if the timing characteristics of the first signal match the measured timing characteristics (820). If the timing characteristics do not match, the control circuit may adjust the timing of the second signal (822).

If the timing characteristics of the first signal match the measured timing characteristics, the control circuit may continue to monitor the first signal to determine if the first signal is being received. The control circuit may further comprise a first timeout and a second timeout that may cause the varying transparency to be paused or the control circuit to power down. For example, the operation of the control circuit may comprise steps similar to those introduced in steps 520-526 of FIG. 5.

The methods, devices, and systems described above may be implemented in many different ways in many different combinations of hardware, software or both hardware and software. For example, all or parts of the system may include circuitry in a controller, a processor, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. An eyewear device for improving a perceived contrast of a screen, the eyewear device comprising:
   at least one optical element configured to receive light emitted from a video screen, the at least one optical element comprising:
      a first passband configured to transmit a first transmitted range of wavelengths of light through the at least one optical element from the video screen, wherein the first passband is configured to block a plurality of visible wavelengths of light outside of the first transmitted range of wavelengths, the plurality of visible wavelengths comprises a first blocked range corresponding to shorter wavelengths than the first transmitted range and a second blocked range corresponding to longer wavelengths than the first transmitted range;
      a second passband corresponding to a second transmitted range of wavelengths of light, the second transmitted range corresponding to longer wavelengths than the second blocked range, the second passband being further configured to block light at a third blocked range of wavelengths of light, the third blocked range corresponding to longer wavelengths than the second transmitted range;
      a third passband corresponding to a third transmitted range of wavelengths of light, the third transmitted range corresponding to longer wavelengths than the third blocked range.

2. The device according to claim 1, wherein the first transmitted range corresponds to a first display primary of the video screen.

3. The device according to claim 1, wherein the second transmitted range of wavelengths corresponds to a second display primary of the video screen.

4. The device according to claim 1, wherein the third transmitted range of wavelengths corresponds to a third display primary of the video screen.

5. The device according to claim 1, wherein the third passband is further configured to block light at a fourth blocked range of wavelengths of light, the fourth blocked range corresponding to longer wavelengths than the third transmitted range.

6. A method for improving a perceived contrast of a video screen, the method comprising:
   receiving a first signal from a transmitting device, the first signal corresponding to a first pattern of light emitted from the video screen;
   outputting a second signal from at least one circuit or processor in response to the receipt of the first signal;
   varying a transparency of at least one optical element in response to the second signal, the transparency being coordinated with the first pattern of light emitted from the video screen.

7. The method according to claim 6 wherein the at least one optical element comprises a first optical element and a second optical element.

8. The method according to claim 7, wherein the first optical element and the second optical element are configured to vary in transparency together with the first pattern of light emitted from the video screen.

9. The method according to claim 6, further comprising measuring timing characteristics of the varying transparency of the at least one optical element.

10. The method according to claim 9, further comprising communicating the timing characteristics of the varying transparency to the at least one circuit or processor.

11. The method according to claim 10, further comprising adjusting the varying transparency by comparing the first pattern of light and the second pattern of light.

12. The method according to claim 6, wherein the at least one optical element comprises at least one filter, the at least one filter configured to pass light at a first range of wavelengths and block light outside the first range of wavelengths.

13. A system for privately viewing an image displayed on a video screen, the system comprising:
    at least one optical element, the at least one optical element of a display device being operable to vary in transparency;
    a receiver device being operable to receive a first signal from the display device; and
    at least one circuit operable to receive the first signal from the receiver device and transmit a second signal to control the transparency of the at least one optical element in response to the first signal, wherein a pattern of the variation in transparency of the at least one optical element corresponds to a pattern of transmission for a hidden image on the video screen.

14. The system according to claim 13, wherein an inverse of the pattern of the variation in transparency corresponds to a privacy image displayed on the video screen.

15. The system according to claim 13, wherein the pattern of the variation in transparency comprises a timing sequence.

16. The system according to claim 15, wherein the pattern of the timing sequence varies to over time to improve privacy of the hidden image.

17. The method according to claim 6, wherein the at least one optical element is embedded in eyewear.

18. The method according to claim 6, wherein the at least one optical element comprises a shutter.

19. The system according to claim 13, wherein the at least one optical element comprises a shutter.

20. The system according to claim 13, wherein the pattern of transmission for a hidden image on the video screen is a temporal pattern of emission and non-emission of light.

* * * * *